US008693499B2

(12) United States Patent
Chandrasekaran et al.

(10) Patent No.: US 8,693,499 B2
(45) Date of Patent: Apr. 8, 2014

(54) DYNAMIC ADJUSTMENT OF BANDWIDTH ALLOCATION FOR AN IN-PROGRESS MEDIA SESSION

(75) Inventors: Subramanian Chandrasekaran, Redmond, WA (US); Anthony Bryan Bell, Carnation, WA (US)

(73) Assignee: Microsoft Corporation, Redmond, WA (US)

( * ) Notice: Subject to any disclaimer, the term of this patent is extended or adjusted under 35 U.S.C. 154(b) by 265 days.

(21) Appl. No.: 12/857,581

(22) Filed: Aug. 17, 2010

(65) Prior Publication Data
US 2012/0044955 A1 Feb. 23, 2012

(51) Int. Cl.
*H04J 3/16* (2006.01)

(52) U.S. Cl.
USPC ........... 370/468; 370/230; 370/232; 370/235; 370/231

(58) Field of Classification Search
USPC .......... 370/230, 232, 235, 401, 468; 709/226, 709/227, 228, 231
See application file for complete search history.

(56) References Cited

U.S. PATENT DOCUMENTS

| 5,826,169 | A | 10/1998 | Natarajan | |
|---|---|---|---|---|
| 6,011,804 | A * | 1/2000 | Bertin et al. | 370/468 |
| 6,404,738 | B1 * | 6/2002 | Reininger et al. | 370/236 |
| 6,529,475 | B1 | 3/2003 | Wan et al. | |
| 6,738,348 | B1 * | 5/2004 | Rollins | 370/230 |
| 6,834,302 | B1 * | 12/2004 | Harvell | 709/224 |
| 6,862,288 | B2 * | 3/2005 | Sharma et al. | 370/403 |
| 6,876,668 | B1 * | 4/2005 | Chawla et al. | 370/468 |
| 7,120,114 | B1 | 10/2006 | Miyamoto | |
| 7,369,559 | B2 | 5/2008 | Garakani et al. | |
| 7,406,061 | B2 * | 7/2008 | Harsch | 370/328 |
| 7,561,593 | B1 * | 7/2009 | Wilkie | 370/450 |
| 7,577,725 | B1 * | 8/2009 | Sitaraman et al. | 709/221 |
| 7,634,558 | B1 * | 12/2009 | Mangal et al. | 709/224 |
| 7,739,383 | B1 * | 6/2010 | Short et al. | 709/226 |
| 7,870,251 | B2 * | 1/2011 | Streijl | 709/224 |
| 7,886,057 | B2 * | 2/2011 | Rosenberg et al. | 709/227 |
| 8,169,912 | B2 * | 5/2012 | Lee et al. | 370/236 |

(Continued)

FOREIGN PATENT DOCUMENTS

WO 2004004249 A1 1/2004

OTHER PUBLICATIONS

"Polycom® and Juniper Networks® HD Video Conferencing Solution", Retrieved at <<http://www.polycom.com/global/documents/partners_alliances/strategic_alliances/polycom-juniper-solutions-brief.pdf >>, Sep. 28, 2009, pp. 1-4.
"Call Admission Control", Retrieved at << http://www.bytbredbandsdelare.nu/cac.pdf >>, Nov. 8, 2004, p. 1.
"Call Admission Control", Retrieved at << http://www1.cisco.com/en/US/docs/voice_ip_comm/cucm/admin/5_1_3/ccmsys/a02cac.pdf >>, May 25, 2010, pp. 1-8.

*Primary Examiner* — Rasheed Gidado
(74) *Attorney, Agent, or Firm* — Sonia Cooper; Jim Ross; Micky Minhas

(57) ABSTRACT

A client in a media session periodically transmits a "keepalive" message that indicates that a new amount of bandwidth is requested for the in-progress media session. A bandwidth policy service receives the keepalive message and determines whether the new amount of bandwidth can be allocated to the in-progress media session. If the service determines that the new amount of bandwidth can be allocated to the session, the service transmits a response to the keepalive message that indicates that the new amount of bandwidth has been allocated to the media session. The client receives the response and adjusts the bandwidth utilized by the in-progress session to the new amount of bandwidth.

11 Claims, 5 Drawing Sheets

(56) References Cited

U.S. PATENT DOCUMENTS

2008/0117075 A1* 5/2008 Seddigh et al. ......... 340/825.36
2008/0165796 A1* 7/2008 Martinez et al. ............. 370/458
2008/0298237 A1 12/2008 Dos Remedios et al.
2009/0059899 A1* 3/2009 Bendelac ..................... 370/352
2010/0124196 A1* 5/2010 Bonar et al. ................. 370/329

* cited by examiner

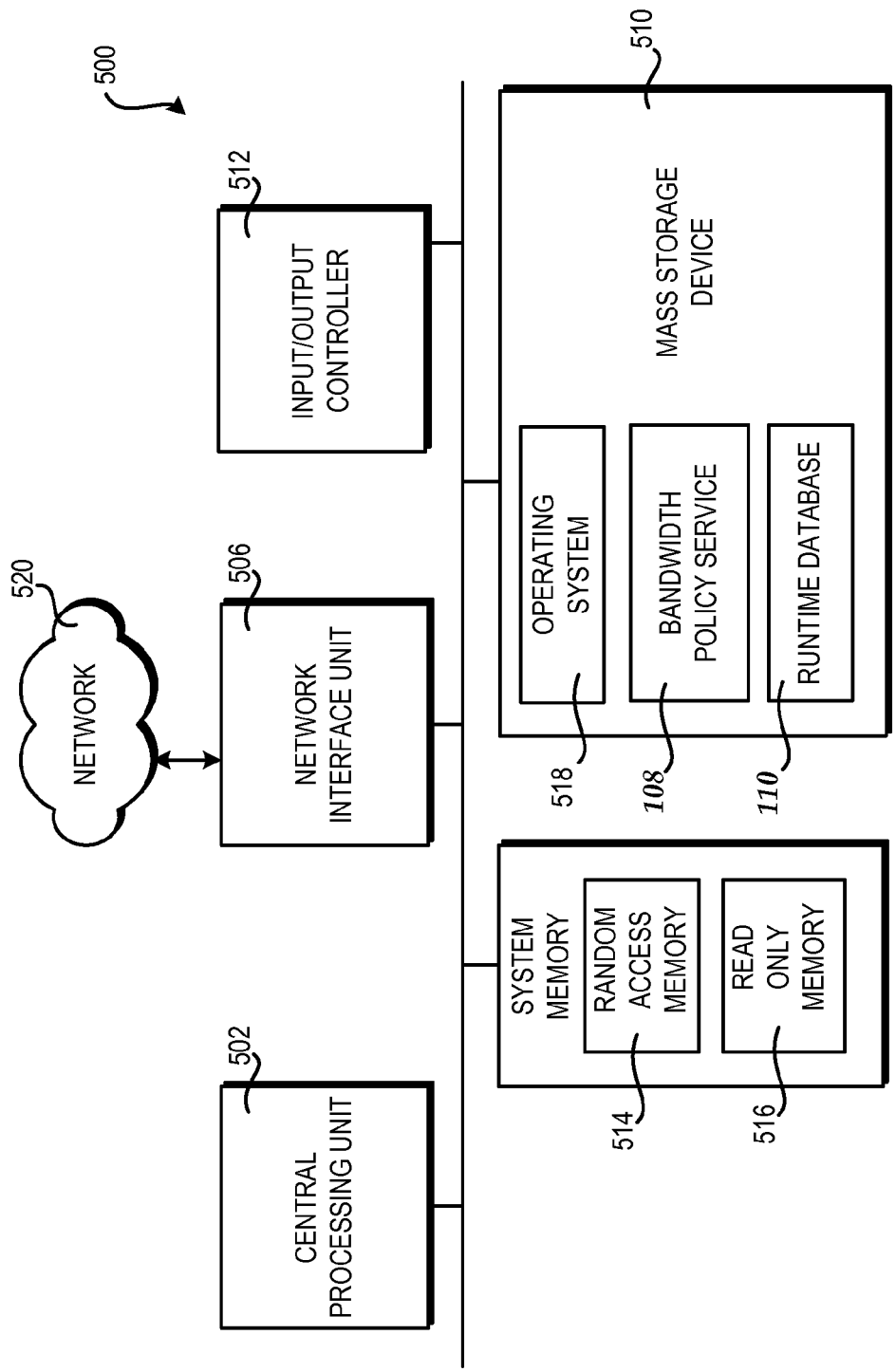

DYNAMIC ADJUSTMENT OF BANDWIDTH ALLOCATION FOR AN IN-PROGRESS MEDIA SESSION

BACKGROUND

Large organizations may operate many different physical locations around a city, state, country, or even around the world. In order to provide data and voice connectivity between locations, a number of wide area network ("WAN") links may be established. The WAN links can be utilized to support data communications between the locations, including audio and/or audio/video sessions made between client devices placed at the locations. For instance, voice over Internet protocol ("VoIP") calls may be made between clients placed at various locations connected by one or more WAN links. Similarly, video calls might also be made between clients placed at locations connected by WAN links.

Establishing and maintaining network links can be very expensive. As a consequence, mechanisms are often used in an attempt to maximize the utilization of the bandwidth available on WAN and other types of network links. Maximizing the utilization of bandwidth, however, can be challenging for various reasons. For example, client devices may vary the data transmission bit rate automatically during a session in some installations. As a result, the amount of bandwidth utilized may change during the course of session. This can make accounting for bandwidth utilization very difficult.

It is with respect to these and other considerations that the disclosure made herein is presented.

SUMMARY

Technologies are described herein for dynamic adjustment of bandwidth allocation for an in-progress media session. Through the utilization of the technologies and concepts presented herein, clients participating in a media session provide a periodic message indicating that they are still present and connected to the session. The message might also request that a new amount of bandwidth be allocated to the in-progress media session. If the requested amount of bandwidth is granted to the in-progress media session, a record of the bandwidth allocation may be made, thereby permitting the bandwidth utilized during media sessions to be more easily accounted for than in some previous solutions.

According to one aspect presented herein, a bandwidth policy request may be generated prior to the establishment of a media session (the terms "session" and "media session" as utilized herein refer to a network audio or video call). The bandwidth policy request is a request for a specified amount of bandwidth for the session. The bandwidth policy request may be made to a bandwidth policy service configured to receive and respond to bandwidth policy requests and other types of messages detailed herein.

In response to receiving a bandwidth policy request, a determination is made as to whether the requested amount of bandwidth may be granted. For instance, a determination may be made to ensure that the requested amount of bandwidth does not exceed an available amount of bandwidth for the relevant network link. Once a determination has been made as to whether the requested bandwidth can be allocated, a response may be returned in response to the bandwidth policy request that indicates whether the session may be established. The response might also specify an amount of bandwidth that can be allocated for the session. The session might then be established if the bandwidth request is granted, or cancelled if the bandwidth request is denied. The amount of bandwidth allocated to the session might also be recorded in a database, referred to herein as a "runtime database," or in another manner.

Once a media session has been established, clients in the session may periodically transmit a "keepalive" message (which may be referred to herein simply as a "message"). Each keepalive message indicates that the respective client is still present and connected to the media session. A keepalive message might also include data indicating that a new amount of bandwidth is requested for the in-progress media session. The new amount of bandwidth might be more or less than the amount of bandwidth previously allocated to the in-progress media session. The client might also receive a response to the keepalive message indicating that the request for the new amount of bandwidth was granted. The client may adjust the bandwidth utilized by the in-progress media session to the new amount of bandwidth in response to receiving such a message. For instance, the settings of a coder-decoder ("codec") may be modified in view of the new amount of bandwidth or a new codec might be selected.

According to other aspects presented herein, a bandwidth policy service is provided that is configured to receive and respond to keepalive messages transmitted by media session clients. In particular, the bandwidth policy service is configured to receive keepalive messages from clients during the course of an in-progress media session. The service is further configured to determine based upon such a message whether a new amount of bandwidth has been requested for an in-progress media session. If such a request is received, the service then determines whether the new amount of bandwidth can be allocated to the in-progress media session. If the service determines that the new amount of bandwidth can be allocated to the session, the service transmits a response to the keepalive message that indicates that the new amount of bandwidth has been allocated to the media session. Otherwise, the service transmits a response to the keepalive message that indicates that the new amount of bandwidth has not been allocated to the media session.

According to other aspects, the service determines whether the new amount of bandwidth can be allocated to the in-progress media session by determining whether the new amount of bandwidth is less than an amount of bandwidth previously allocated to the in-progress media session. If the new amount of bandwidth is less than the amount of bandwidth previously allocated to the in-progress media session, the request for the new amount of bandwidth is granted. If the new amount of bandwidth is greater than the amount of bandwidth previously allocated to the in-progress media session, the service computes a delta bandwidth by determining the difference between the requested amount of bandwidth and the amount of bandwidth previously allocated to the in-progress media session. If the delta bandwidth is available on a network link utilized by the media session, the request for the new amount of bandwidth is granted and the runtime database may be updated with the new amount of bandwidth allocated to the in-progress media session. The request for the new amount of bandwidth is denied if the delta bandwidth is not available on the network link. Other policy considerations might also be utilized to deny the request for the new amount of bandwidth.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore,

BRIEF DESCRIPTION OF THE DRAWINGS

FIG. 5 is a computer architecture diagram showing an illustrative computer hardware and software architecture for a computing system capable of implementing the embodiments presented herein.

DETAILED DESCRIPTION

Figure 1:
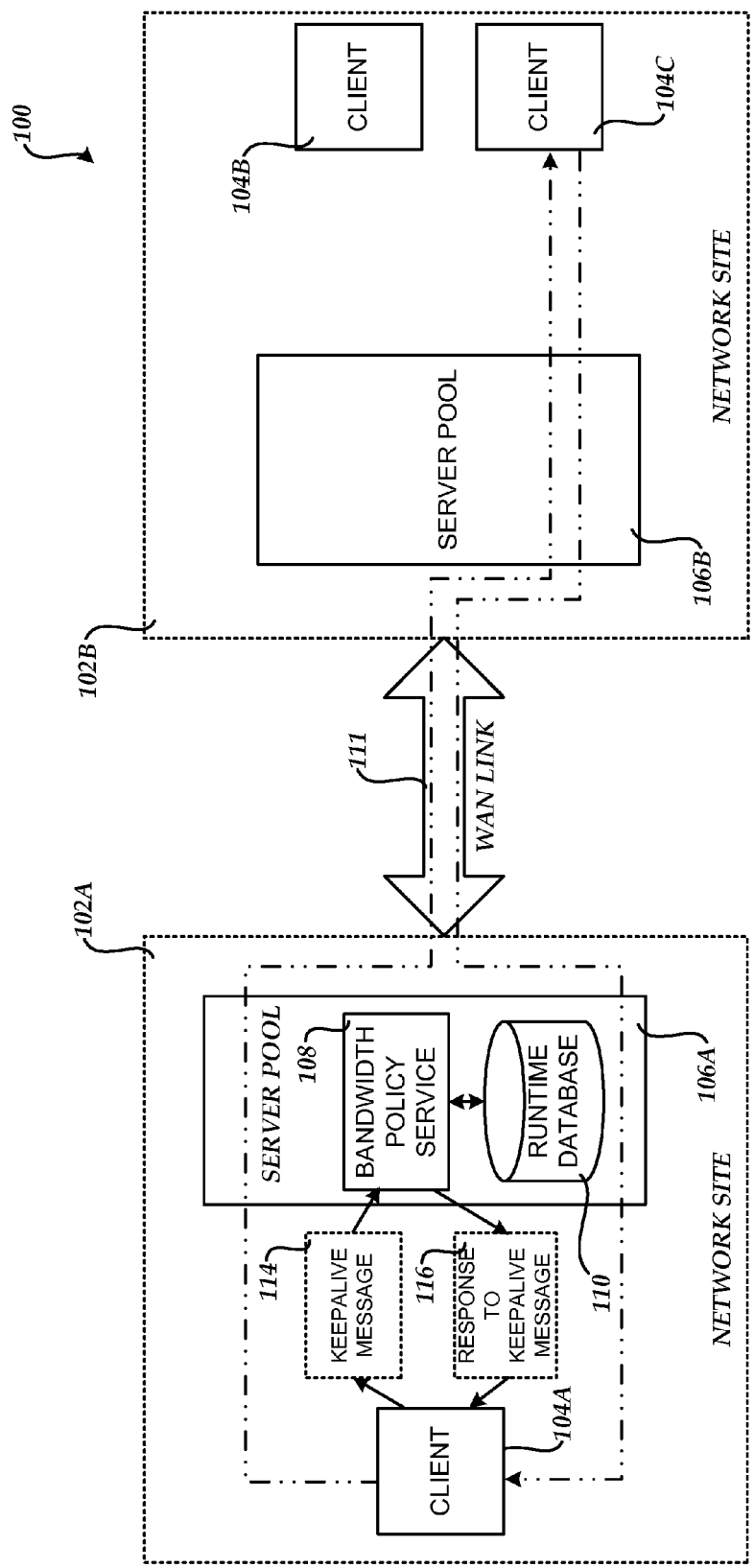
FIG. 1 is a network diagram showing an illustrative operating environment along with several components provided according to embodiments presented herein.
Figure 2:
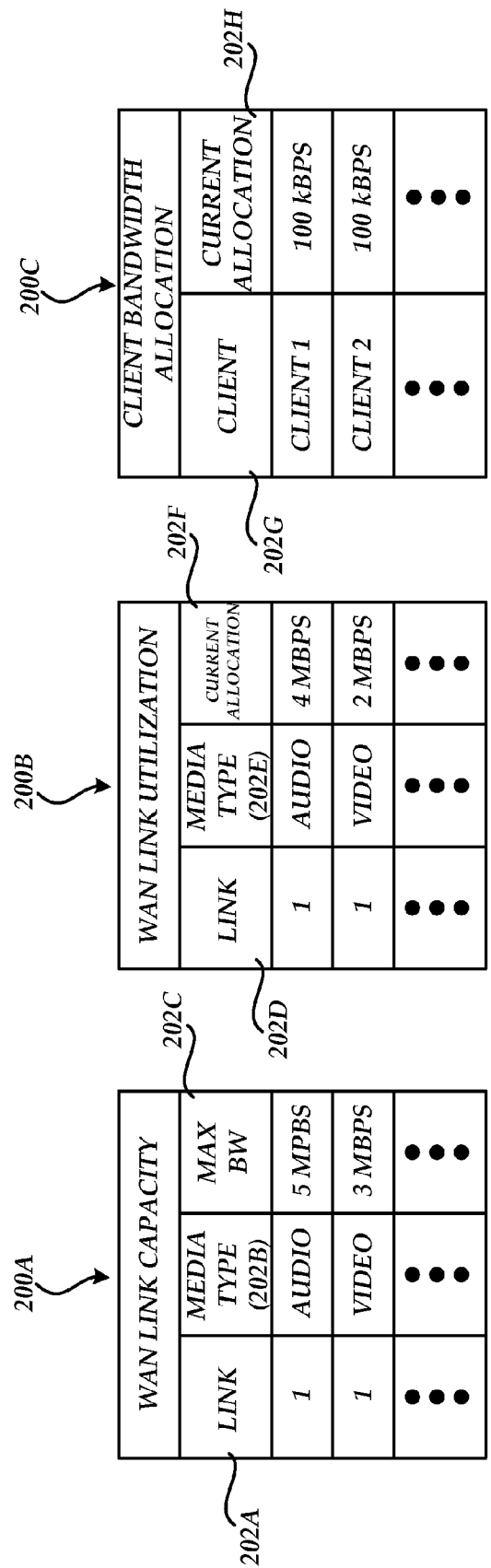
FIGS. 2A-2C are data structure diagrams showing aspects of data structures for storing WAN link capacity data, WAN link utilization data, and client bandwidth allocation data according to one embodiment disclosed herein.

The following detailed description is directed to technologies for dynamic adjustment of bandwidth allocation for an in-progress media session. As discussed briefly above, according to embodiments disclosed herein, a client in a media session periodically transmits a "keepalive" message that indicates that a new amount of bandwidth is requested for the in-progress media session. A bandwidth policy service receives the keepalive message and determines whether the new amount of bandwidth can be allocated to the in-progress media session. If the service determines that the new amount of bandwidth can be allocated to the session, the service transmits a response to the keepalive message that indicates that the new amount of bandwidth has been allocated to the media session. The client receives the response and adjusts the bandwidth utilized by the in-progress session to the new amount of bandwidth. Through the use of this mechanism, the bandwidth utilized during media sessions can be more easily accounted for, and potentially more efficiently allocated, than in some previous solutions.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and which are shown by way of illustration specific embodiments or examples. Referring now to the drawings, in which like numerals represent like elements through the several figures, aspects of a computing system and methodology for dynamic adjustment of bandwidth allocation for an in-progress media session will be described.

Turning now to FIG. 1, details will be provided regarding one embodiment presented herein for dynamic adjustment of bandwidth allocation for an in-progress media session. In particular, FIG. 1 is a network diagram showing an illustrative operating environment along with several components provided according to embodiments presented herein. As shown in FIG. 1, the environment 100 includes a network site 102A configured for communication with a network site 102B by way of a WAN link 111. As discussed briefly above, the network sites 102A-102B may be located in different physical locations around a city, state, country, or even around the world.

In order to provide data and voice connectivity between the network sites 102A-102B, a WAN link 111 has been established between the two locations. The WAN link 111 can be utilized to support data communications between the network sites 102A-102B, including audio and/or audio/video sessions made between client devices situated at the network sites 102A-102B. For instance, VoIP calls may be made between clients located at the network sites 102A-102B. Similarly, video calls might also be made between clients placed at the network sites 102A-102B. Additional details regarding this process will be provided below. It should be appreciate that the term "call" and "session" may be used interchangeably herein.

As shown in FIG. 1, the network sites 102A-102B include a number of clients 104A-104C (which may be referred to herein collectively as the clients 104). For instance, the network site 102B includes the clients 104B-104C and the network site 102A includes the client 104A. The clients 104A-104C are devices that are capable of establishing an audio or video communications session with another client via a network link For instance, in various embodiments, the clients 104A-104C may be wired or wireless telephones configured for communication over a data communications connection, desktop, laptop, or other types of computers configured with an appropriate software client for audio and/or video communications over a data communications link, and other types of devices. It should be appreciated that while FIG. 1 illustrates two network sites 102A-102B and three clients 104A-104C, many more network sites and clients may be utilized. It should also be appreciated that the environment 100 has been shown in a simplified form and that many more network connections and computing systems may be utilized in order to implement the various concepts disclosed herein.

As also shown in FIG. 1, each of the network sites includes a server pool 106. For instance, the network site 102A has a server pool 106A and the network site 102B includes a server pool 106B. The server pools 106A-106B are installations of one or more server computers configured to provide services to the clients 104A-104C. For instance, according to various embodiments, the server pools 106A-106B may assist the clients 104A-104C during call setup and establishment, name resolution, media conversion, and in other ways. In order to provide this functionality, the servers operating within the server pools 106A-106B may be configured to expose a number of services to the clients 104A-104C.

One service offered by the server pools 106A-106B is a bandwidth policy service 108. The bandwidth policy service 108 is an executable component executed by one or more of the server computers of the server pools 106A-106B. As will be discussed in greater detail herein, the bandwidth policy service 108 is configured to receive and respond to bandwidth policy requests and keepalive messages received from the clients 104A-104C. A bandwidth policy request is a request for a specified amount of bandwidth for a new media session. As will be describe in greater detail below, one of the clients 104A-104C may generate a bandwidth policy request prior to the establishment of a media session.

FIG. 1 also illustrates aspects of the establishment of a voice or video call between a client 104C (which may be referred to herein as a "calling client") located at the network site 102B and the client 104A (which may be referred to herein as a "called client") located at the network site 102A. In particular, when a user of the client 104C initiates an audio or video call to the client 104A, the client 104C transmits a call notification to the client 104A. In order to determine whether the call can be accepted, the client 104A transmits a bandwidth policy request to the bandwidth policy service 108 prior to accepting the call.

As discussed briefly above, the bandwidth policy request is a request to the bandwidth policy service 108 for authorization to establish a session with the client 104C. According to one implementation, the bandwidth policy request includes a minimum amount of bandwidth requested and a maximum amount of bandwidth requested for the new session. The bandwidth policy request might also include the network address of the client 104A and the network address of the client 104C.

In response to receiving the bandwidth policy request, the bandwidth policy service 108 determines whether the request may be satisfied and the call between the client 104A and the client 104C may be established. In particular, the bandwidth policy service 108 may first utilize the network addresses provided in the bandwidth policy request to identify the particular WAN link 111 that will be utilized for the new session. Utilizing the network addresses of the client 104A and the client 104C, the bandwidth policy service 108 can also determine the available amount of bandwidth on the WAN link 111. In one implementation, the bandwidth policy service 108 identifies a subnet from the network addresses of the endpoints. From the subnet, the bandwidth policy service determines the physical locations of the endpoints. Once the physical location has been determined, the bandwidth policy service can determine the provisioned bandwidth for the physical location. Once the available amount of bandwidth on the WAN link 111 has been determined in this or another manner, the bandwidth policy service 108 can evaluate the bandwidth policy request.

According to one implementation, the bandwidth policy service compares the requested amount of bandwidth to the available bandwidth on the WAN link 111. If the requested amount of bandwidth exceeds the available amount of bandwidth on the WAN link 111, the bandwidth policy request might be denied. If the requested amount of bandwidth is less than the available bandwidth on the WAN link 111, the bandwidth policy service 108 may grant the bandwidth policy request.

Once the bandwidth policy service 108 has evaluated the bandwidth policy request, the bandwidth policy service 108 may transmit a response to the client 104A. The response may indicate whether the bandwidth policy request was granted or denied. The response might also specify a particular amount of bandwidth to be utilized by the client 104A in setting up a session with the client 104C. For instance, the response to the bandwidth policy request might indicate an amount of bandwidth to be utilized by the client 104 that is between the minimum amount requested and the maximum amount requested in the bandwidth policy request 114.

If the bandwidth policy service 108 indicates in the response that the requested amount of bandwidth has been granted, the client 104A will transmit a call acceptance to the client 104C. Thereafter, the clients 104A and 104C will establish a media session and begin transmitting media over the WAN link 111. For instance, if the session established between the client 104A and the client 104C is a voice session, the clients 104A and 104C will transmit appropriate audio data across the WAN link 111. The session between the client 104A and the client 104C may then continue and be terminated in a conventional fashion. Additional details regarding the operation of the bandwidth policy service 108 will be provided below with respect to the FIGS. 2A-5.

Once a media session has been established, each of the clients 104 in the session may periodically transmit a keepalive message 114 to the bandwidth policy service 108. Each keepalive message 114 indicates that the respective client 104 is still present and connected to the media session. A keepalive message 114 might also include data indicating that a new amount of bandwidth is requested for the in-progress media session. The new amount of bandwidth might be more or less than the amount of bandwidth previously allocated to the in-progress media session.

The client 104 might also receive a response 116 to the keepalive message 114 from the bandwidth policy service 108 indicating that the request for the new amount of bandwidth was granted or denied. If the request is granted, the client 104 may adjust the bandwidth utilized by the in-progress media session to the new amount of bandwidth in response to receiving such a message 116. For instance, the settings of a codec utilized to encode media for the session may be modified in view of the new amount of bandwidth or a new codec might be selected altogether.

As discussed briefly above, the bandwidth policy service 108 is configured to receive and respond to the keepalive messages 114 transmitted by the clients 104. In particular, the bandwidth policy service 108 is configured to receive the keepalive messages 114 from the clients 104 during the course of an in-progress media session. The service 108 is further configured to determine based upon such a message 114 whether a new amount of bandwidth has been requested for an in-progress media session.

If a request for a new allocation of bandwidth for a media session is received, the service 108 then determines whether the new amount of bandwidth can be allocated to the in-progress media session. If the service 108 determines that the new amount of bandwidth can be allocated to the session, the service 108 transmits a response 116 to the keepalive message 114 that indicates that the new amount of bandwidth has been allocated to the media session. Otherwise, the service 108 transmits a response 116 to the keepalive message 114 that indicates that the new amount of bandwidth has not been allocated to the media session.

According to other aspects, the service 108 determines whether the new amount of bandwidth can be allocated to the in-progress media session by determining whether the new amount of bandwidth is less than an amount of bandwidth previously allocated to the in-progress media session. If the new amount of bandwidth is less than the amount of bandwidth previously allocated to the in-progress media session, the service 108 grants the request for the new amount of bandwidth.

If the new amount of bandwidth is greater than the amount of bandwidth previously allocated to the in-progress media session, the service 108 computes a delta bandwidth by determining the difference between the requested amount of bandwidth and the amount of bandwidth previously allocated to the in-progress media session. If the delta bandwidth is available on a network link utilized by the media session, such as the WAN link 111, the service 108 grants the request for the new amount of bandwidth. Additionally, the service 108 may store data in the runtime database 110 indicating the new amount of bandwidth allocated to the in-progress media session. The service 108 may deny the request for the new amount of bandwidth if the delta bandwidth is not available on the network link. As mentioned above, the service 108 might utilize other policy considerations to grant or deny a request for the new amount of bandwidth. Additional details regarding the operation of the clients 104 and the bandwidth policy server 108 will be provided below with respect to FIGS. 2A-5.

FIGS. 2A-2C are data structure diagrams showing aspects of several data structures for storing WAN link capacity data, WAN link utilization data, and a client bandwidth allocation according to one embodiment disclosed herein. The data structures 200A-200C may be stored in the runtime database 110 and utilized by the bandwidth policy service 108 to dynamically adjust the bandwidth allocated to an in-progress media session in the manner disclosed herein. It should be appreciated that the data structures 200A-200C are merely illustrative and that other data structures or types might be utilized to store the data described herein. The data might be stored in a completely different fashion and additional data might also be stored.

FIG. 2A shows a data structure 200A configured for storing data indicating WAN link capacity. As discussed briefly above, the bandwidth policy service 108 might utilize information regarding the capacity and utilization of a WAN link to determine whether a request for a new amount of bandwidth for an in-progress media session may be granted. In the illustrative embodiment shown in FIG. 2A, the data structure 200A includes a first field 202A that identifies the WAN link 111. The data structure 200A also includes a field 202B that identifies a particular media type, such as audio or video. The data structure 200A also includes a field 202C that identifies the maximum bandwidth for a particular link and media type. For instance, in the example shown in FIG. 2A, data has been provided for a WAN link 111 capable of supporting five mega-bits per second ("Mbps") of audio and three Mbps of video.

FIG. 2B shows a data structure 200B utilized to maintain data indicating a current utilization of a WAN link 111. The data stored in the data structure 200B might also be utilized by the bandwidth policy service 108 to determine whether a request for a new amount of bandwidth for an in-progress media session may be granted.

The illustrative data structure 200B shown in FIG. 2B includes a field 202D for storing data identifying the particular WAN link 111, a field 202E for storing data identifying a particular media type, and a field 202F for storing data identifying a current allocation of bandwidth for the link and media type. For instance, in the example shown in FIG. 2B, the data structure 200B includes data indicating that the WAN link 111 currently has four Mbps of audio and two Mbps of video allocated thereto. Accordingly, in view of the example data structures 200A and 200B, the bandwidth policy service 108 may conclude that the WAN link 111 has one Mbps available for audio and one Mbps available for video sessions.

FIG. 2C shows an illustrative data structure 200C that may be utilized to store data indicating the amount of bandwidth utilized by each client in an in-progress media session. In the illustrative example shown in FIG. 2C, the data structure 200C includes a field 202G for storing data identifying each client in an in-progress media session and a field 202H for storing data indicating the currently allocated bandwidth to each client. In the example shown in FIG. 2C, one hundred kilo-bits per second ("kbps") has been allocated to two clients. It should be appreciated that the data structure 200C has also been simplified and that other data might also be stored in the data structure 200C for use by the bandwidth policy service 108. Additional detail regarding the use of the data stored in the data structures 200A-200C by the bandwidth policy service 108 will be provided below with respect to FIGS. 3-4.

It should be appreciated that although the data structures shown in FIGS. 2A-2C herein have been presented in the context of a system for enabling audio and video calls, the mechanisms presented herein may be utilized to manage other types of data streams. For instance, the embodiments disclosed herein may be utilized to manage data streams generated by application sharing programs, file sharing programs, and other types of data streams. The data structures shown in FIGS. 2A-2C may be modified to support these additional media types, or other data structures might be utilized altogether.

Figure 3:
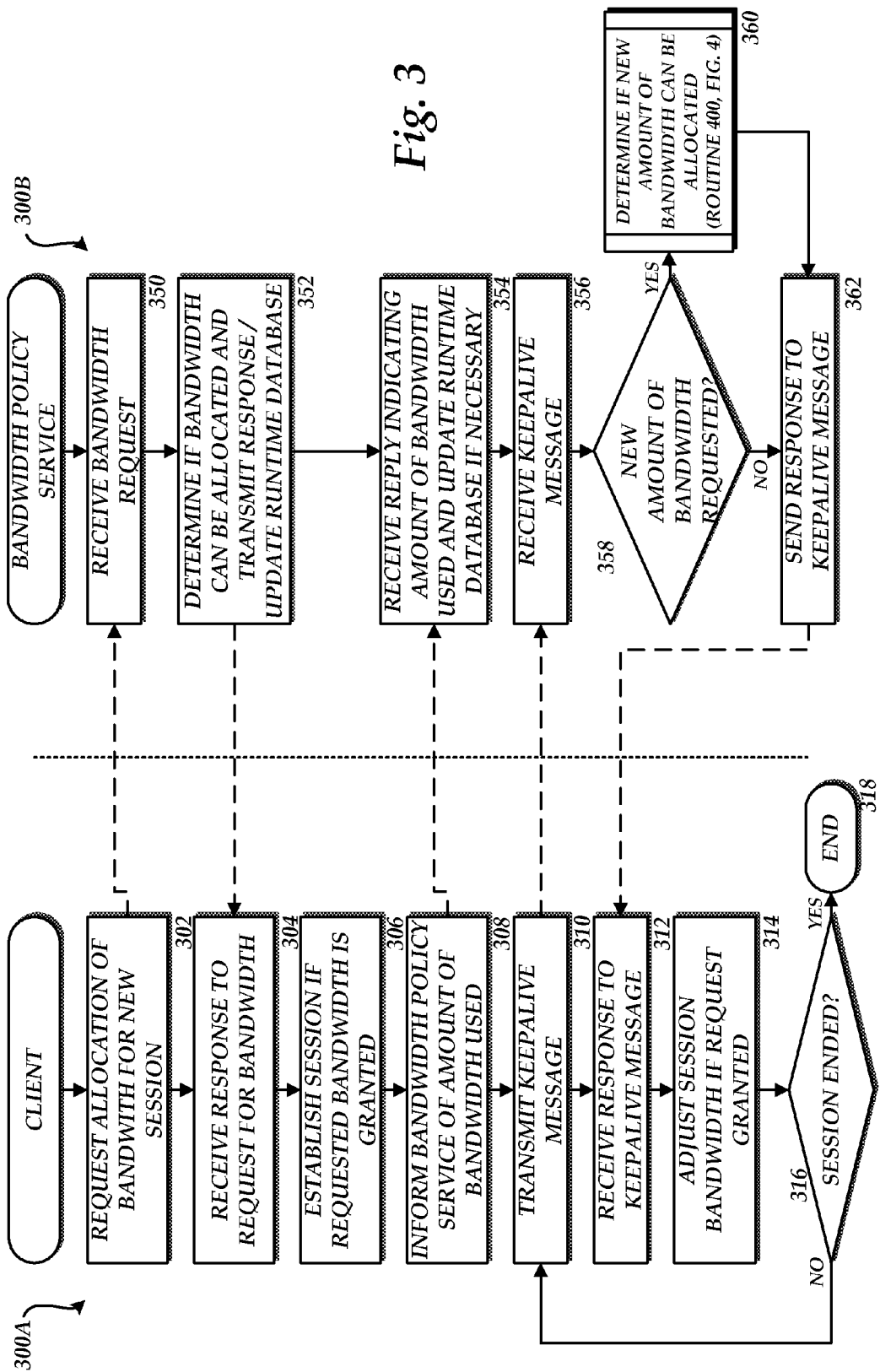
FIG. 3 shows several flow diagrams that illustrate aspects of the operation of a client and a bandwidth policy service according to one embodiment disclosed herein.

Turning now to FIG. 3, additional details will be provided regarding the embodiments presented herein for dynamic adjustment of bandwidth allocation for an in-progress media session. In particular, FIG. 3 shows several routines 300A and 300B that illustrate aspects of the operation of a called client 104A and a bandwidth policy service 108, respectively, according to one embodiment disclosed herein.

It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in a different order than those described herein.

The routine 300A begins at operation 302, where a client 104, such as the client 104A, requests allocation of bandwidth for a new media session. In particular, according to one embodiment, the client 104A transmits a bandwidth policy request to the bandwidth policy service 108.

The bandwidth policy service 108 receives the request for an allocation of bandwidth to a new media session at operation 350 of the routine 300B. In response to receiving the bandwidth policy request, the routine 300B proceeds to operation 352, where the bandwidth policy service 108 determines if the requested amount of bandwidth can be allocated to the new media session. As discussed briefly above, the bandwidth policy service 108 might utilize the contents of the data structures 200A-200B to determine whether the appropriate WAN link can support the requested allocation of bandwidth for the new session. As also discussed above, the bandwidth policy service 108 might utilize other policy factors to influence its determination as to whether bandwidth can be allocated in response to the bandwidth policy request.

Once the bandwidth policy service 108 has made its determination as to whether bandwidth can be allocated for a new media session, the bandwidth policy service 108 transmits a response to the requesting client 104A. Additionally, the bandwidth policy service 108 might update the contents of the data structures 200B and 200C to reflect the new allocation of bandwidth. In particular, the field 202F might be updated to reflect the allocation to the appropriate link and the field 202H might be updated to reflect the allocation to a particular client 104A or session.

The client 104A receives the response to the bandwidth policy request at operation 304 of the routine 300A. The routine 300A then proceeds to operation 306 where the client 104A establishes the new media session if the requested bandwidth is granted by the bandwidth policy service 108. As discussed above with respect to FIG. 1, the client 104A will transmit a call acceptance to the client 104C in order to establish the new media session. Thereafter, the clients 104A and 104C will begin transmitting media over the WAN link 111. For instance, if the session established between the client 104A and the client 104C is a voice session, the clients 104A and 104C will transmit appropriate audio data across the WAN link 111. If the media session is a video call, the clients 104A and 104C will transmit appropriate video data across the WAN link 111. The session between the client 104A and the client 104C may then continue and be terminated in a conventional fashion.

Once a session has been established between the client 104A and the client 104C, the client 104A will transmit a reply to the bandwidth policy service 108 that indicates the actual amount of bandwidth utilized for the newly established session. This is because the amount of bandwidth utilized for the newly established session might be less than the amount of bandwidth allocated to the new session by the bandwidth policy service 108 in response to the bandwidth policy request.

The bandwidth policy service 108 receives the reply from the client 104 indicating the actual amount of bandwidth used for the new session at operation 354 of the routine 300B. In response thereto, the bandwidth policy service 108 updates the appropriate entries in the data structures 200B and 200C to reflect the actual utilization of the appropriate WAN link 111 and the actual bandwidth allocated to the clients participating in the new media session. If the bandwidth actually utilized in the new media session is the same as the amount allocated by the bandwidth policy service 108 in response to the bandwidth policy request, then no update to the runtime database 110 will be necessary.

From operation 308, the routine 300 proceeds to operation 310. At operation 310, the client 104A transmits a keepalive message 114 to the bandwidth policy service 108. As described above, the keepalive message 114 indicates to the bandwidth policy service 108 that the transmitting client 104A is still present and connected to the media session. If the client 104A determines that a new amount of bandwidth is necessary for the media session, the keepalive message 114 might also include data indicating that a new amount of bandwidth is requested for the in-progress media session. The new amount of bandwidth might be more or less than the amount of bandwidth previously allocated to the media session.

The bandwidth policy service 108 receives the keepalive message 114 at operation 356 of the routine 300B. The routine 300B then proceeds to operation 358 where the bandwidth policy service 108 determines whether the client 104A has requested a new amount of bandwidth in the keepalive message 114. If not, the bandwidth policy service 108 transmits a response to the client 104A in response to the keepalive message 114 at operation 362 that acknowledges receipt of the keepalive message 114. If, however, the bandwidth policy service 108 determines at operation 358 that a new amount of bandwidth has been requested, the routine 300B proceeds to operation 360.

Figure 4:
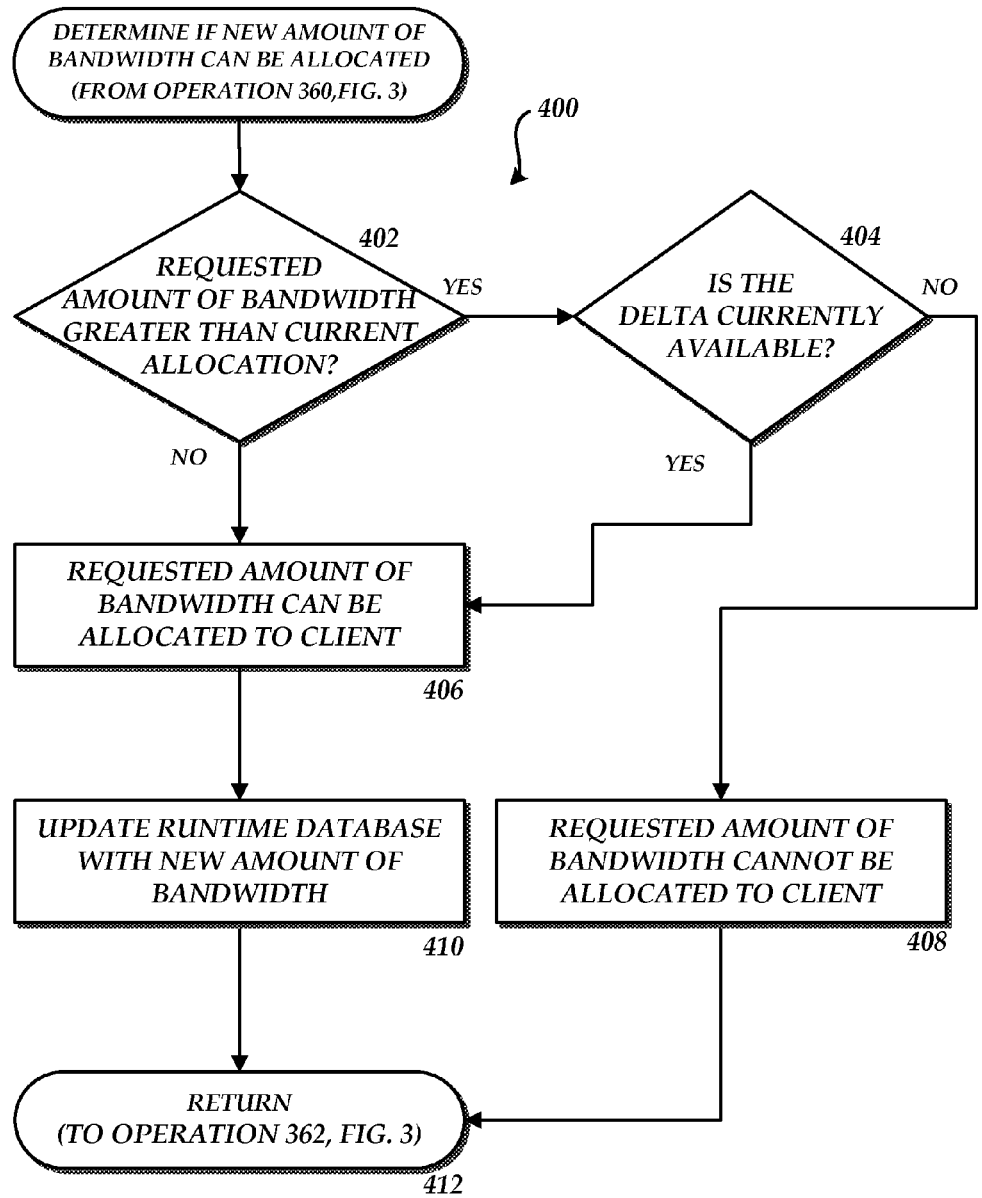
FIG. 4 is a flow diagram showing additional aspects of the operation of a bandwidth policy service according to one embodiment presented herein.

At operation 360, the bandwidth policy service 108 determines if the requested amount of bandwidth can be allocated to the in-progress media session. An illustrative routine 400 will be described below with respect to FIG. 4 showing operations performed by the bandwidth policy service 108 in one embodiment for making this determination.

Once the bandwidth policy service 108 has determined whether the newly amount of bandwidth can be allocated to the in-progress media session, the routine 300B proceeds to operation 362 where the bandwidth policy service 108 transmits a response 116 to the keepalive message 114 indicating whether the new amount of bandwidth has been allocated to the in-progress media session. For instance, the response 116 might include data indicating an amount of data that has been allocated to the in-progress media session.

The client 104A receives the response 116 to the keepalive message 114 from the bandwidth policy service 108 at operation 312 of the routine 300A. The routine 300A then proceeds to operation 314 where the client 104 examines the contents of the response 116 to determine whether the new amount of bandwidth requested from the bandwidth policy service 108 was granted. If the new amount of bandwidth was granted, the client 104A operates in conjunction with the client 104C to adjust the bandwidth utilized by the in-progress media session to the new amount of bandwidth allocated by the bandwidth policy service 108. For instance, as discussed above, the settings of a codec may be modified in view of the new amount of bandwidth or a new codec might be selected.

Once the session bandwidth has been adjusted, the routine 300A proceeds to operation 316 where the client 104A determines whether the in-progress media session has ended. If the in-progress media session has not ended, the routine 300A proceeds to operation 310 where the client 104A transmits another keepalive message 114. In this manner, the client 104A will periodically transmit a keepalive message 114A and perform the operations described above for adjusting the session bandwidth if necessary or desired. If, at operation 316, the client 104A determines that the session has been ended, the routine 300A proceeds to operation 318, where it ends.

FIG. 4 is a flow diagram showing a routine 400 that illustrates additional aspects of one method performed by the bandwidth policy service 108 to determine if a new amount of bandwidth can be allocated to an in-progress media session. The routine 400 begins at operation 402, where the bandwidth policy service 108 determines whether the requested amount of bandwidth is greater than the amount of bandwidth currently allocated for the in-progress session. In order to make this determination, the bandwidth policy service 108 may compare the requested amount of bandwidth for the in-progress session to the current allocation for the session as stored in the data structure 200C.

If the requested amount of bandwidth is less than the current allocation of bandwidth, the routine 400 proceeds from operation 402 to operation 406. At operation 406, the bandwidth policy service 108 concludes that the requested amount of bandwidth can be allocated to the in-progress media session. The routine 400 then proceeds from operation 406 to operation 410 where the contents of the runtime database 110 are updated with the new amount of bandwidth allocated to the in-progress session. In particular, the contents of the data structure 200B and the data structure 200C may be updated to reflect the newly allocated bandwidth.

If, at operation 402, the bandwidth policy service 108 determines that the requested amount of bandwidth is greater than the currently allocated amount of bandwidth, the routine 400 proceeds from operation 402 to operation 404. At operation 404, the service 108 computes a delta bandwidth by determining the difference between the requested amount of bandwidth and the amount of bandwidth previously allocated to the in-progress media session. The service 108 then determines whether the computed delta amount of bandwidth is currently available on the appropriate network link.

If the delta bandwidth is available on the network link utilized by the media session, the routine 400 proceeds from operation 404 to operation 406 described above. In this manner, the new amount of bandwidth is granted and the runtime database 110 is updated. If, however, the delta bandwidth is not currently available, the routine 400 proceeds from operation 404 to operation 408 where the service 108 determines that the requested amount of bandwidth cannot be allocated to the in-progress media session. From operations 408 and 410, the routine 400 proceeds to operation 412 where it returns to operation 362, described above with reference to FIG. 3.

It should be appreciated that, in the embodiments disclosed herein, the called client 104A transmits the keepalive message 114 to the bandwidth policy service 108. In other embodiments, however, the calling client 104C may transmit the keepalive message 114 to the bandwidth policy service 108. Both the called client 104A and the calling client 104C might also transmit a keepalive message 114 to the bandwidth policy service 108 in another embodiment.

FIG. 5 shows an illustrative computer architecture for a computer 500 capable of executing the software components described herein for dynamic adjustment of bandwidth allocation for an in-progress media session. The computer architecture shown in FIG. 5 illustrates a conventional desktop, laptop computer, or server computer and may be utilized to execute the various software components described herein.

The computer architecture shown in FIG. 5 includes a central processing unit 502 ("CPU"), a system memory 508, including a random access memory 514 ("RAM") and a read-only memory ("ROM") 516, and a system bus 504 that couples the memory to the CPU 502. A basic input/output system ("BIOS") containing the basic routines that help to transfer information between elements within the computer 500, such as during startup, is stored in the ROM 516. The computer 500 further includes a mass storage device 510 for storing an operating system 518, application programs, and other program modules, which will be described in greater detail below.

The mass storage device 510 is connected to the CPU 502 through a mass storage controller (not shown) connected to the bus 504. The mass storage device 510 and its associated computer-readable media provide non-volatile storage for the computer 500. Although the description of computer-readable media contained herein refers to a mass storage device, such as a hard disk or CD-ROM drive, it should be appreciated by those skilled in the art that computer-readable storage media can be any available computer storage media that can be accessed by the computer 500.

By way of example, and not limitation, computer-readable storage media may include volatile and non-volatile, removable and non-removable media implemented in any method or technology for storage of information such as computer-readable instructions, data structures, program modules or other data. For example, computer-readable storage media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other non-transitory medium which can be used to store the desired information and which can be accessed by the computer 500.

According to various embodiments, the computer 500 may operate in a networked environment using logical connections to remote computers through a network such as the network 520. The computer 500 may connect to the network 520 through a network interface unit 506 connected to the bus 504. It should be appreciated that the network interface unit 506 may also be utilized to connect to other types of networks and remote computer systems. The computer 500 may also include an input/output controller 512 for receiving and processing input from a number of other devices, including a keyboard, mouse, or electronic stylus (not shown in FIG. 5). Similarly, an input/output controller may provide output to a display screen, a printer, or other type of output device (also not shown in FIG. 5).

As mentioned briefly above, a number of program modules and data files may be stored in the mass storage device 510 and RAM 514 of the computer 500, including an operating system 518 suitable for controlling the operation of a networked desktop, laptop, or server computer. The mass storage device 510 and RAM 514 may also store one or more program modules. In particular, the mass storage device 510 and the RAM 514 may store the bandwidth policy service 108, which has been described above. The mass storage device 510 and RAM 514 may also store other program modules and data, such as the runtime database 110.

In general, software applications or modules may, when loaded into the CPU 502 and executed, transform the CPU 502 and the overall computer 500 from a general-purpose computing system into a special-purpose computing system customized to perform the functionality presented herein. The CPU 502 may be constructed from any number of transistors or other discrete circuit elements, which may individually or collectively assume any number of states. More specifically, the CPU 502 may operate as one or more finite-state machines, in response to executable instructions contained within the software or modules. These computer-executable instructions may transform the CPU 502 by specifying how the CPU 502 transitions between states, thereby physically transforming the transistors or other discrete hardware elements constituting the CPU 502.

Encoding the software or modules onto a mass storage device may also transform the physical structure of the mass storage device or associated computer readable storage media. The specific transformation of physical structure may depend on various factors, in different implementations of this description. Examples of such factors may include, but are not limited to: the technology used to implement the computer readable storage media, whether the computer readable storage media are characterized as primary or secondary storage, and the like. For example, if the computer readable storage media is implemented as semiconductor-based memory, the software or modules may transform the physical state of the semiconductor memory, when the software is encoded therein. For example, the software may transform the states of transistors, capacitors, or other discrete circuit elements constituting the semiconductor memory.

As another example, the computer readable storage media may be implemented using magnetic or optical technology. In such implementations, the software or modules may transform the physical state of magnetic or optical media, when the software is encoded therein. These transformations may include altering the magnetic characteristics of particular locations within given magnetic media. These transformations may also include altering the physical features or characteristics of particular locations within given optical media, to change the optical characteristics of those locations. Other transformations of physical media are possible without departing from the scope and spirit of the present description, with the foregoing examples provided only to facilitate this discussion.

Based on the foregoing, it should be appreciated that technologies for dynamic adjustment of bandwidth allocation for an in-progress media session have been presented herein. It should be appreciated that although the embodiments disclosed herein have been presented in the context of audio and video calls, the mechanisms presented herein may be utilized to manage other types of streams. For instance, the embodiments disclosed herein may be utilized to manage data streams generated by application sharing programs, file sharing programs, and other types of data streams.

Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A computer-implemented method for dynamically adjusting bandwidth allocation for an in-progress media session, the method comprising:
    receiving, from a client device, a keepalive message during an in-progress media session with another client device, the keepalive message comprising an indication that the client device is connected to the in-progress media session, wherein the keepalive message is received periodically during the in-progress media session, and wherein the media session comprises an audio call or video call;
    determining based upon the keepalive message that a new amount of bandwidth has been requested for the in-progress media session;
    determining whether the new amount of bandwidth is less than or greater than an amount of bandwidth previously allocated to the in-progress media session by
        calculating a delta bandwidth comprising the difference between the new amount of bandwidth and an amount of bandwidth previously allocated to the in-progress media session,
        determining if the delta bandwidth is available on a network link utilized by the in-progress media session, and
        determining that the new amount of bandwidth can be allocated to the in-progress media session in response to determining that the delta bandwidth is available on the network link;
    in response to determining that the new amount of bandwidth that has been requested for the in-progress media session is less than the amount of bandwidth previously allocated to the in-progress media session, granting the request;
    in response to determining that the new amount of bandwidth is greater than the amount of bandwidth previously allocated to the in-progress media session, determining whether the new amount of bandwidth can be allocated to the in-progress media session;
    in response to determining that the new amount of bandwidth can be allocated to the in-progress media session, allocating the new amount of bandwidth to the in-progress media session and transmitting, to the client device, a response to the keepalive message indicating that the new amount of bandwidth has been allocated to the media session; and
    transmitting, to the client device, a response to the keepalive message indicating that the new amount of bandwidth has not been allocated to the media session in response to determining that the new amount of bandwidth cannot be allocated to the in-progress media session, wherein the response specifies a particular amount of bandwidth that can be utilized by the client.

2. The computer-implemented method of claim 1, wherein determining whether the new amount of bandwidth can be allocated to the in-progress media session further comprises determining that the new amount of bandwidth cannot be allocated to the in-progress media session in response to determining that the delta bandwidth is not available on the network link.

3. The computer-implemented method of claim 2, further comprising updating a runtime database with the new amount of bandwidth in response to determining that the new amount of bandwidth can be allocated to the in-progress media session.

4. The computer-implemented method of claim 3, further comprising prior to establishment of the media session:
    receiving a request for allocation of bandwidth to a new media session;
    in response receiving the request for allocation of bandwidth to a new media session, determining whether a requested amount of bandwidth can be allocated to the new media session;
    in response to determining that the requested amount of bandwidth can be allocated to the new media session, updating the runtime database with the requested amount of bandwidth and transmitting a response to the request for allocation of bandwidth to the new media session indicating that the requested amount of bandwidth has been granted; and
    in response to determining that the requested amount of bandwidth cannot be allocated to the new media session, transmitting a response to the request specifying a particular amount of bandwidth that can be utilized by the client in the new media session.

5. A computer-implemented method for dynamically adjusting bandwidth allocation for an in-progress media session, the method comprising:
    determining whether a new amount of bandwidth is required for an in-progress media session between a client device and another client device by calculating a delta bandwidth comprising the difference between the new amount of bandwidth and an amount of bandwidth previously allocated to the in-progress media session, wherein the media session comprises an audio call or a video call;
    in response to determining the new amount of bandwidth required for the in-progress media session, transmitting, from the client device, a keepalive message during the in-progress media session requesting the new amount of bandwidth for the in-progress media session, the keepalive message comprising an indication that the client device is connected to the in-progress media session, wherein the keepalive message is transmitted periodically during the in-progress media session, wherein a server determines if the delta bandwidth is available on a network link utilized by the in-progress media session, and determines that the new amount of bandwidth can be allocated to the in-progress media session in response to determining that the delta bandwidth is available on the network link, and wherein a server grants the request for the new amount of bandwidth if the new amount of bandwidth is less than the amount of bandwidth previously allocated to the in-progress media session;

receiving, at the client device, a response to the keepalive message;

determining based upon the response to the keepalive message whether the request for the new amount of bandwidth for the in-progress media session was granted;

in response to determining that the request for the new amount of bandwidth for the in-progress media session was granted, adjusting, at the client device, the bandwidth utilized by the in-progress media session to the new amount of bandwidth; and in response to determining that the request for the new amount of bandwidth for the in-progress media session was not granted, adjusting, at the client device, the bandwidth utilized by the in-progress media session to a particular amount of bandwidth specified in the response to the keepalive message.

6. The computer-implemented method of claim 5, further comprising prior to establishment of the media session:

transmitting a request for allocation of bandwidth for a new media session, the request identifying a requested allocation of bandwidth for the new media session;

receiving a response to the request for allocation of bandwidth to the new media session;

determining whether the requested allocation of bandwidth has been granted based upon the response to the request for allocation of bandwidth to the new media session; and establishing the session with the requested allocation of bandwidth in response to determining that the requested allocation of bandwidth was granted.

7. The computer-implemented method of claim 5, further comprising periodically transmitting the keepalive message during an in-progress media session even when a new amount of bandwidth is not required for the in-progress media session.

8. The computer-implemented method of claim 5, wherein the keepalive message is transmitted to a bandwidth policy service.

9. A computer-readable storage medium not including a signal and having computer-executable instructions stored thereupon which, when executed by a computer, cause the computer to:

receive, from a client device, a periodic keepalive message during an in-progress media session, the keepalive message comprising an indication that the client device is connected to the in-progress media session with another client device, wherein the in-progress media session comprises an audio call or a video call;

determine based upon the keepalive message that a new amount of bandwidth has been requested for the in-progress media session;

determining whether the new amount of bandwidth is less than or greater than an amount of bandwidth previously allocated to the in-progress media session;

in response to determining that the new amount of bandwidth is less than the amount of bandwidth previously allocated to the in-progress media session, granting the request;

in response to determining that the new amount of bandwidth that has been requested for the in-progress media session is greater than the amount of bandwidth previously allocated to the in-progress media session, determine whether the new amount of bandwidth can be allocated to the in-progress media session by calculating a delta bandwidth comprising the difference between the new amount of bandwidth and an amount of bandwidth previously allocated to the in-progress media session, determining if the delta bandwidth is available on a network link utilized by the in-progress media session, and determining that the new amount of bandwidth can be allocated to the in-progress media session in response to determining that the delta bandwidth is available on the network link;

in response to determining that the new amount of bandwidth can be allocated to the in-progress media session, to allocate the new amount of bandwidth to the in-progress media session and to transmit, to the client device, a response to the keepalive message indicating that the new amount of bandwidth has been allocated to the media session; and in response to determining that the new amount of bandwidth cannot be allocated to the in-progress media session, to transmit a response to the keepalive message indicating that the new amount of bandwidth has not been allocated to the media session, wherein the response specifies a particular amount of bandwidth that can be utilized by the client.

10. The computer-readable storage medium of claim 9, having further computer-executable instructions stored thereupon which, when executed by the computer, cause the computer to update a runtime database with the new amount of bandwidth in response to determining that the new amount of bandwidth can be allocated to the in-progress media session.

11. The computer-readable storage medium of claim 10, having further computer-executable instructions stored thereupon which, when executed by the computer, cause the computer to:

receive a request for allocation of bandwidth to a new media session prior to establishment of the media session;

in response receiving the request for allocation of bandwidth to a new media session, to determine whether a requested amount of bandwidth can be allocated to the new media session;

in response to determining that the requested amount of bandwidth can be allocated to the new media session, to update the runtime database with the requested amount of bandwidth and to transmit a response to the request for allocation of bandwidth to the new media session indicating that the requested amount of bandwidth has been granted; and in response to determining that the requested amount of bandwidth cannot be allocated to the new media session, transmitting a response to the request specifying a particular amount of bandwidth that can be utilized by the client in the new media session.

* * * * *